(12) United States Patent
Kang (10) Patent No.: US 9,906,181 B2
(45) Date of Patent: Feb. 27, 2018

(54) VOICE COIL MOTOR DRIVER AND CAMERA MODULE HAVING THE SAME

(71) Applicant: SAMSUNG ELECTRO-MECHANICS CO., LTD., Suwon-si (KR)

(72) Inventor: Shin Jae Kang, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 0 days.

(21) Appl. No.: 15/091,134

(22) Filed: Apr. 5, 2016

(65) Prior Publication Data

US 2016/0315573 A1  Oct. 27, 2016

(30) Foreign Application Priority Data

Apr. 23, 2015  (KR) .................. 10-2015-0057186

(51) Int. Cl.
| | | |
|---|---|---|
| *G03B 13/00* | (2006.01) | |
| *H02P 25/034* | (2016.01) | |
| *H04N 5/232* | (2006.01) | |
| *H02K 41/035* | (2006.01) | |
| *H02P 25/028* | (2016.01) | |
| *H02K 41/03* | (2006.01) | |

(52) U.S. Cl.
CPC ....... *H02P 25/034* (2016.02); *H02K 41/0354* (2013.01); *H02P 25/028* (2013.01); *H04N 5/23287* (2013.01); *G03B 2205/0069* (2013.01)

(58) Field of Classification Search
CPC . H04N 5/23287; H02P 25/034; H02P 25/028; G03B 2205/0069; H02K 41/0354
USPC ..................................... 348/357; 310/12.16
See application file for complete search history.

(56) References Cited

U.S. PATENT DOCUMENTS

| | | | | |
|---|---|---|---|---|
| 7,609,472 B2 * | 10/2009 | Atkinson | ............. | G11B 5/5565 |
| | | | | 360/69 |
| 8,482,233 B2 * | 7/2013 | Kuroiwa | .................. | G11B 5/40 |
| | | | | 318/400.26 |
| 9,178,462 B2 * | 11/2015 | Kurosawa | ............. | H02P 25/034 |
| 2001/0043429 A1 | 11/2001 | Saito et al. | | |
| 2015/0028789 A1 * | 1/2015 | Uchida | .................. | H02P 25/028 |
| | | | | 318/619 |
| 2016/0198082 A1 * | 7/2016 | Choi | ....................... | G06T 5/003 |
| | | | | 348/333.02 |

FOREIGN PATENT DOCUMENTS

| | | |
|---|---|---|
| JP | 11-353830 A | 12/1999 |
| JP | 2012-248025 A | 12/2012 |

* cited by examiner

*Primary Examiner* — Ngoc-Yen Vu
(74) *Attorney, Agent, or Firm* — NSIP Law (57) ABSTRACT

A camera module having a voice coil motor driver, including a driving controller configured to compare a reference voltage and a negative feedback voltage to output a driving control signal, and a driver configured to drive a coil of the voice coil motor according to the driving control signal.

18 Claims, 7 Drawing Sheets

VOICE COIL MOTOR DRIVER AND CAMERA MODULE HAVING THE SAME

CROSS-REFERENCE TO RELATED APPLICATION

This application claims benefit 35 USC 119(a) of Korean Patent Application No. 10-2015-0057186 filed on Apr. 23, 2015, with the Korean Intellectual Property Office, the entire disclosure of which is incorporated herein by reference for all purposes.

BACKGROUND

1. Field

The following description relates to a voice coil motor driver and a camera module having the same.

2. Description of Related Art

Recently released mobile devices have been equipped with camera modules, and as performance levels of mobile devices have improved, high performance camera modules, with resolutions of up to 10-megapixels have been provided therein. However, space available for the mounting of the camera module may be limited due to inherent size limitations of the mobile device, while such high pixel camera modules may be relatively large.

Due to a relatively narrow lens aperture, and low image pixel size, image quality may be degraded due to fine motion occurring from external vibrations, hand-shake, or other unwanted movement at the time of capturing images. Therefore, an optical image stabilization (OIS) function may be used, and an auto focus function may also be used in order to reduce the likelihood of degradation and easily capture a high-definition image.

In order to perform the above-mentioned OIS function and auto focus function, a voice coil motor may be used in the camera module to move the lens. Linear current driving is performed in such a voice coil motor, but it may be difficult to obtain stable driving performance while using the above-mentioned linear current driving.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a voice coil motor driver includes a driving controller configured to compare a reference voltage and a negative feedback voltage to output a driving control signal, and a driver configured to drive a coil of the voice coil motor according to the driving control signal.

The driving controller may include a comparator configured to compare the reference voltage to the feedback voltage and output the driving control signal, and a P metal-oxide-semiconductor field-effect transistor configured to activate or deactivate according to the driving control signal output by the comparator. The P metal-oxide-semiconductor field-effect transistor may be configured to allow a current generating the feedback voltage to flow when activated.

The driver may further include a transistor unit comprising a current mirror circuit of the P metal-oxide-semiconductor field-effect transistor of the controller. The current mirror circuit may include at least one P metal-oxide-semiconductor field-effect transistor, and an output controller configured to control a turn-on or turn-off operation of the at least one P metal-oxide-semiconductor field-effect transistor of the transistor unit in response to the driving control signal. The transistor may include a plurality of transistors, wherein the plurality of transistors form a half bridge or H-bridge.

The voice coil motor may further include a reference current generator configured to output a reference current. The reference voltage may be generated from the reference current.

The voice coil motor may further include a linearity compensation circuit configured to compensate for linearity of an output current of the driver. The linearity compensation circuit may include a detector configured to compare a detection voltage to the feedback voltage to determine a difference therebetween, and the detector further configured to control compensation through successive approximation resistor, and a current compensator configured to add current to or subtract current from a reference current converted to the level of the reference voltage according to the control of the detector. The detection voltage may include an output voltage from the driver.

The detector may include a voltage divider configured to divide the feedback voltage, a sample and hold circuit configured to maintain a voltage level of the detection voltage for a predetermined time, a voltage comparator configured to compare an output of the voltage divider to an output of the sample and hold circuit, a successive approximation resistor (SAR) logic circuit configured to perform a logic operation on a voltage output from the voltage comparator, and a register configured to output a code corresponding to a result of the logic operation.

The register may include stored codes corresponding to results of logic operations.

In another general aspect, a camera module includes a sensor module configured to detect physical properties of a lens module, a controller configured to control movement of the lens module according to a detection signal from the sensor module, and a voice coil motor driver. The voice coil motor driver may be configured to compare a reference voltage according to a control signal of the controller and a negative feedback voltage, generate a driving control signal, and drive a coil of a voice coil motor according to the driving control signal to move the lens module.

The voice coil motor driver may include a reference current generator configured to generate a reference current according to the controller control signal, a driving controller configured to convert the reference current into the reference voltage, and compare the reference voltage to the negative feedback voltage to generate the driving control signal, and a driver configured to drive the coil of the voice coil motor according to the driving control signal.

The driving controller may include a comparator, configured to compare the reference voltage to the feedback voltage and output the driving control signal, and a P metal-oxide-semiconductor field-effect transistor configured to activate and deactivate according to the driving control signal. The P metal-oxide-semiconductor field-effect transistor may be configured to allow a current generating the feedback voltage to flow when activated.

The driver may include a transistor unit comprising a current mirror circuit of the P metal-oxide-semiconductor field-effect transistor of the driving controller, wherein the current mirror circuit may include at least one P metal-oxide-semiconductor field-effect transistor, and an output controller configured to control a turn-on or turn-off operation of at least one P metal-oxide-semiconductor field-effect transistor of the transistor unit in response to the driving control signal.

The transistor unit may include a plurality of transistors, wherein the plurality of transistors form a half bridge or H-bridge.

The voice coil motor driver may further include a linearity compensation circuit configured to compensate for linearity of an output current of the driver. The linearity compensation circuit may include a detector configured to compare a detection voltage to the feedback voltage to determine a difference therebetween, and to control compensation using a successive approximation resistor. The voice coil motor driver may further include a current compensator configured to add current to or subtract current from a reference current converted to the reference voltage according to control of the detector. The detection voltage may include an output voltage from the driver.

The detector may include a voltage divider configured to divide the feedback voltage, a sample and hold circuit configured to maintain a voltage level of the detection voltage for a predetermined time, a voltage comparator configured to compare the output of the voltage divider to the output of the sample and hold circuit, a successive approximation resistor logic circuit configured to perform a logic operation on a voltage output by the voltage comparator, and a register configured to transfer a code corresponding to a result of the logic operation. The register may include stored codes corresponding to results of logic operations.

Other features and aspects will be apparent from the following detailed description, the drawings, and the claims.

BRIEF DESCRIPTION OF DRAWINGS

FIGS. 6A through 7 are graphs illustrating a linearity compensation operation of the voice coil motor driver according to the embodiment illustrated in FIG. 5.

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent to one of ordinary skill in the art. The sequences of operations described herein are merely examples, and are not limited to those set forth herein, but may be changed as will be apparent to one of ordinary skill in the art, with the exception of operations necessarily occurring in a certain order. Also, descriptions of functions and constructions that are well known to one of ordinary skill in the art may be omitted for increased clarity and conciseness.

The features described herein may be embodied in different forms, and are not to be construed as being limited to the examples described herein. Rather, the examples described herein have been provided so that this disclosure will be thorough and complete, and will convey the full scope of the disclosure to one of ordinary skill in the art.

Figure 1:
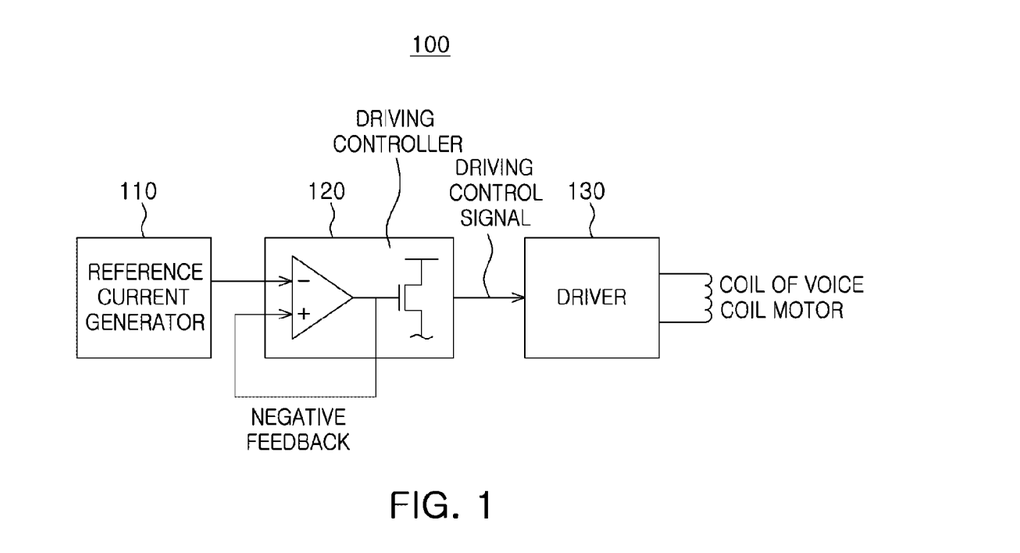
FIG. 1 is a schematic block diagram of a voice coil motor driver according to an embodiment.
Figure 2:
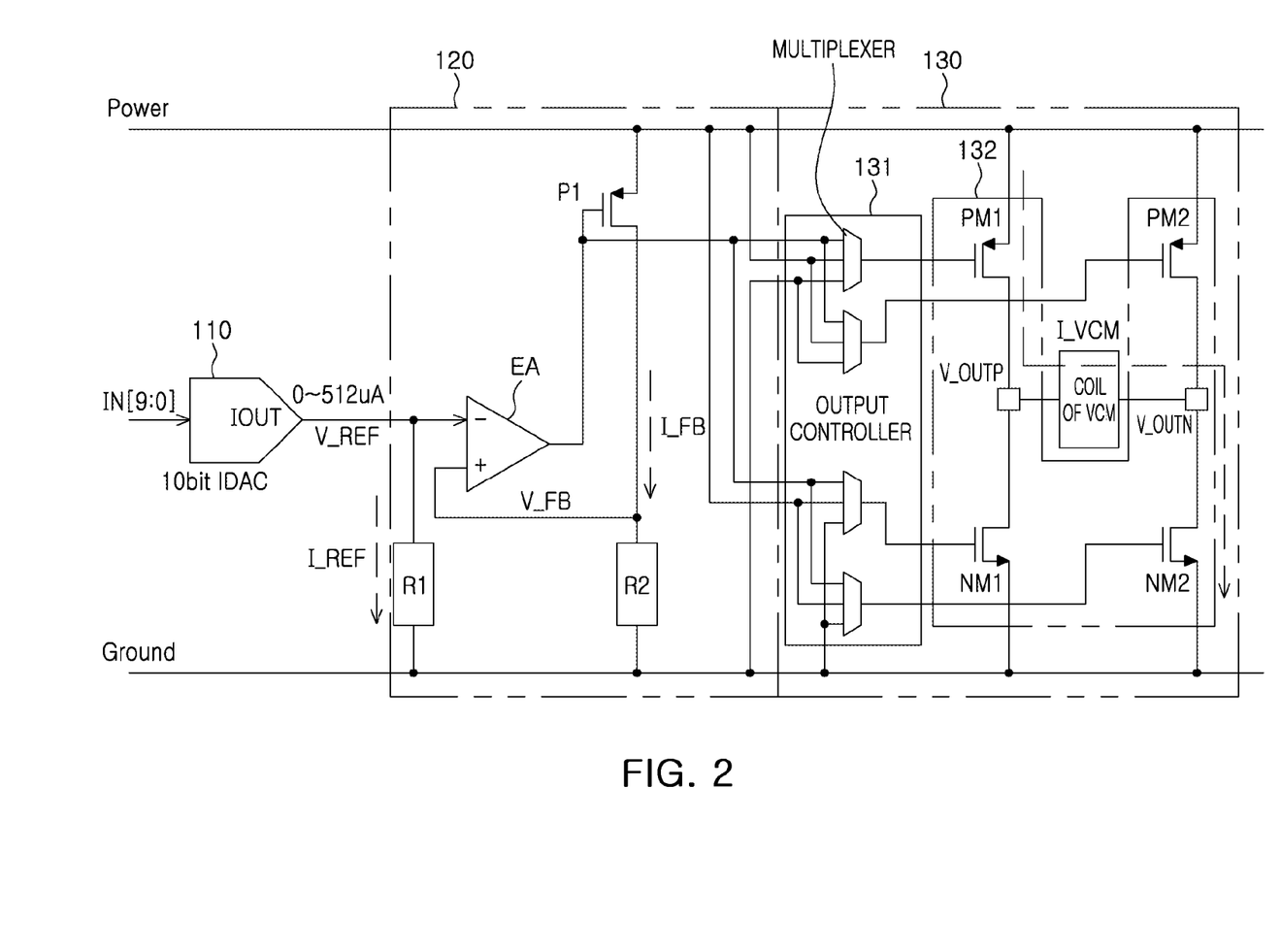
FIG. 2 is a schematic circuit diagram of the voice coil motor driver illustrated in FIG. 1.

FIG. 1 is a schematic block diagram of a voice coil motor driver according to an embodiment, and FIG. 2 is a schematic circuit diagram of the voice coil motor driver illustrated in FIG. 1.

Referring to FIGS. 1 and 2, a voice coil motor driver 100 includes a driving controller 120 and a driver 130, and further includes a reference current generator 110.

The reference current generator 110 generates and outputs a reference current (I_REF) depending on a control signal (IN[9:0]). For example, the reference current generator 110 is a 10 bit current mode digital-analog converter (10 bit IDAC). Therefore, a current level of the reference current (I_REF) of the reference current generator 110 may be 0 to 512 uA.

The driving controller 120 includes resistors R1 and R2, a comparator EA, and a P metal-oxide-semiconductor field-effect transistor (MOSFET) P1. The resister R1 and the reference current (I_REF) create a reference voltage (V_REF), and a current (I_FB) flowing into the P MOSFET P1 output from the comparator EA and the resistor R2 create a feedback voltage (V_FB), thereby providing a negative feedback voltage to the comparator EA.

The comparator EA compares the reference voltage (V_REF) to the feedback voltage (V_FB) to output a driving control signal for controlling operation of the P MOSFET P1 so that the reference voltage (V_REF) and the feedback voltage (V_FB) are equal.

An operation of the comparator EA as described above may be represented by the following Equation 1.

$$I_{FB} = \frac{V_{FB}}{R_2} = \frac{R_1}{R_2} * I_{REF} \qquad \text{(Equation 1)}$$

$$V_{FB} = V_{REF} \text{(negative feedback)}$$

The driver 130 includes at least one P MOSFET PM1, wherein the at least one P MOSFET PM1 is a current mirror circuit of the P MOSFET P1 of the driving controller 120. The driving control signal of the comparator EA is transferred to at least one P MOSFET PM1, such that a current based on the current flowing in the P MOSFET P1 flows in at least one P MOSFET PM1. An amount of current flowing in at least one P MOSFET PM1 is determined depending on a ratio between a channel width of at least one P MOSFET PM1 and a channel width of the P MOSFET P1.

An output controller 131 includes a multiplexer, and the multiplexer transfers the driving control signal of the comparator EA to at least one P MOSFET PM1 and controls conduction of at least one P MOSFET PM1 depending on the operation control of the P MOSFET P1 by the comparator EA, thereby controlling a current flowing in a coil of a voice coil motor (VCM).

The driver 130 includes a transistor unit 132, wherein the transistor unit 132 includes at least one P MOSFET PM1 or a plurality of transistors PM1, PM2, NM1, and NM2.

For example, among the plurality of transistors PM1, PM2, NM1, and NM2, first and second P MOSFETs PM1 and PM2 are disposed on a high side, and first and second N MOSFETs NM1 and NM2 are disposed on a low side, thereby forming an H-bridge in which both ends of the coil of the voice coil motor are connected to a connection point between the first P MOSFET PM1 and the first N MOSFET NM1 and a connection point between the second P MOSFET PM2 and the second N MOSFET NM2. Alternatively, the plurality of transistors may also form a half bridge.

The output controller 131 controls operation of the first and second P MOSFETs PM1 and PM2 and the first and second N MOSFETs NM1 and NM2 according to the driving control signal by the comparator EA, to control the current flowing in the coil of the voice coil motor. Therefore, the output controller 131 implements a forward driving operation, a backward driving operation, or pull-up mode, pull-down mode and high-Z modes of the voice coil motor.

For example, the output controller 131 includes a plurality of multiplexers for transferring a signal to the gate of the first and second P MOSFETs PM1 and PM2 and the first and second N MOSFETs NM1 and NM2, respectively. A multiplexer receives the output signal of the comparator EA and driving power (Power) and is connected to a ground (Ground), and then, transfers the signal and the driving power to the gate of the first P MOSFETs PM1. Therefore, the multiplexer transfers the output signal of the comparator EA to the gate of the first P MOSFETs PM1 when in the forward driving operation of the voice coil motor. The multiplexer transfers the driving power (Power) to the gate of the first P MOSFETs PM1 when in the pull-up mode of the voice coil motor. In addition, the multiplexer electronically connects the ground (Ground) to the gate of the first P MOSFETs PM1 when in the pull-down mode. Subsequently, the multiplexer allows the gate of the first P MOSFETs PM1 to float when in the high-Z mode.

When the voice coil motor is in forward driving operation, the first P MOSFETs PM1 and the second N MOSFETs NM2 are turned on, and the second P MOSFETs PM2 and the first N MOSFETs NM1 are turned off. When the voice coil motor is in backward driving operation, the second P MOSFETs PM2 and the first N MOSFETs NM1 are turned on, and the first P MOSFETs PM1 and the second N MOSFETs NM2 are turned off.

An output current (I_VCM) of the driver 130 is represented by the following Equation 2.

$$I_{VCM} = \frac{R_1}{R_2} * \frac{W_{HB}}{W_{CM}} * I_{REF} \qquad \text{(Equation 2)}$$

According to Equation 2, $W_{HB}$ refers to the channel width of the first P MOSFET PM1, and $W_{CM}$ refers to the channel width of the P MOSFET P1 of the driving controller 120.

Figure 3:
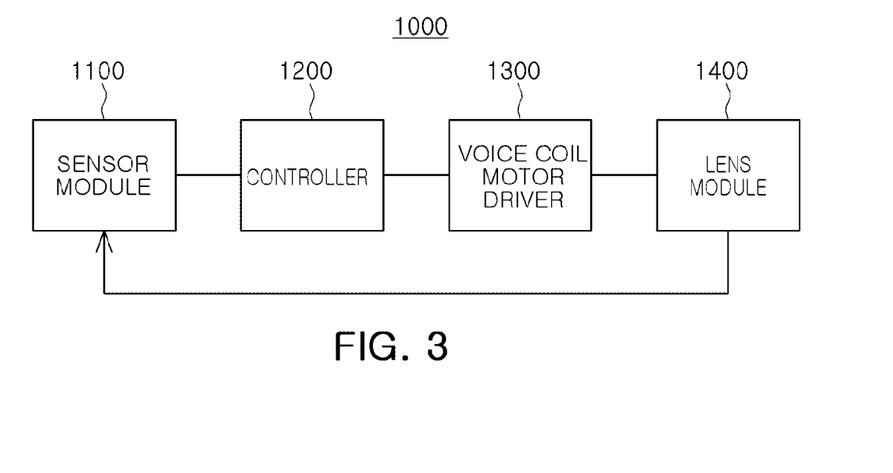
FIG. 3 is a schematic block diagram of a camera module according to an embodiment.

FIG. 3 is a schematic block diagram of a camera module according to an embodiment. Referring to FIG. 3, a camera module 1000 includes a sensor module 1100, a controller 1200, a voice coil motor driver 1300, and a lens module 1400.

The sensor module 1100 detects physical properties of the lens module 1400 such as a position, focus, and horizontal or perpendicular movement of the lens module 1400. For example, the sensor module 1100 may include a gyro sensor or a hall sensor, or both, and may also include an analog-digital converter converting a detected signal into a digital signal.

The controller 1200 provides a control signal controlling movement of the lens module 1400 based on a detection signal from the sensor module 1100.

The control signal from the controller 1200, for example, is a 10-bit control signal (IN[9:0]) as illustrated in FIG. 2. The voice coil motor driver 1300 controls a current flowing in a coil of a voice coil motor based on the control signal from the controller 1200, to move the lens module 1400 to a desired position.

Figure 4A:
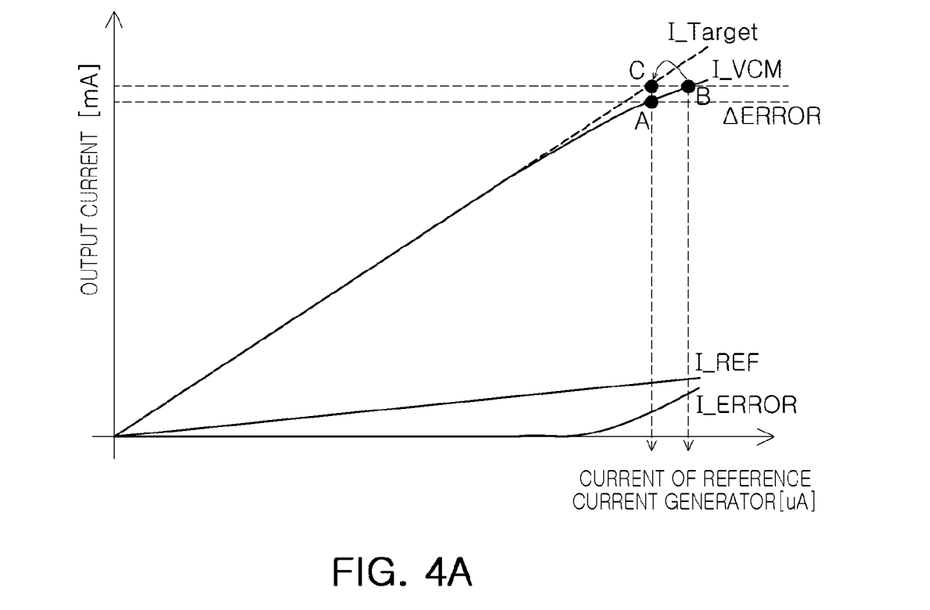
FIGS. 4A through 4C are graphs illustrating electrical properties of the voice coil motor driver illustrated in FIGS. 1 and 2.
Figure 4B:
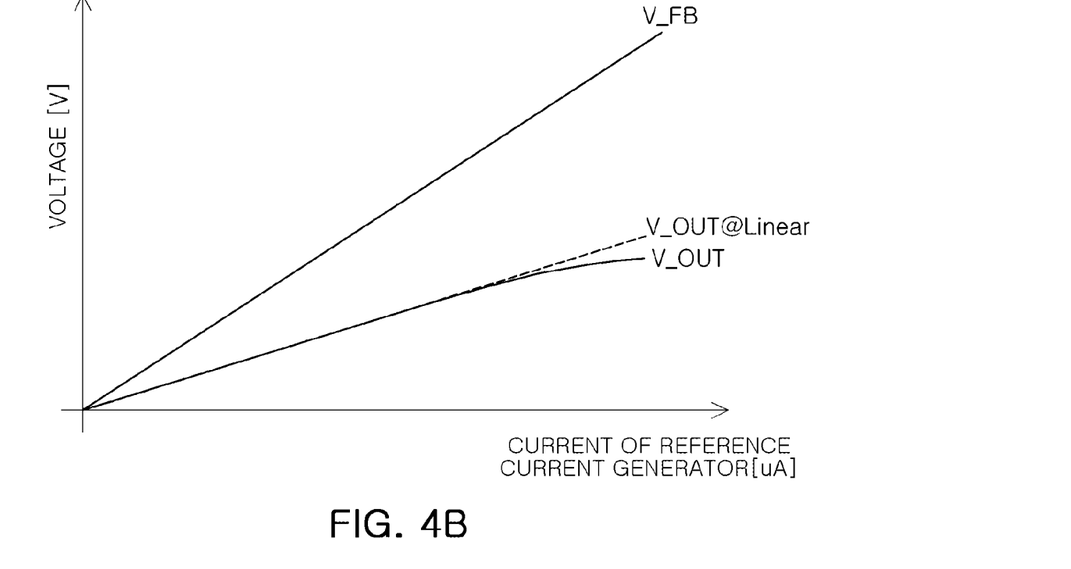
Figure 4C:
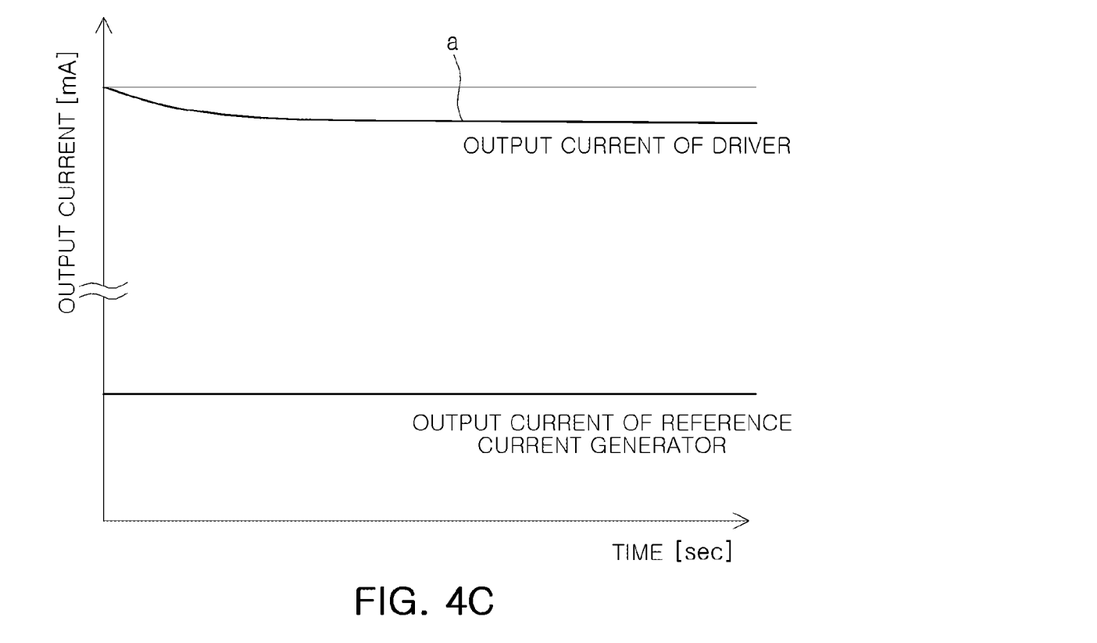

FIGS. 4A through 4C are graphs illustrating electrical properties of the voice coil motor driver illustrated in FIGS. 1 and 2. Referring to FIG. 4A, in the voice coil motor driver 100 illustrated in FIGS. 1 and 2, the output current (I_VCM) of the driver 130 is linearly increased in accordance with an increase in the reference current (I_REF) of the reference current generator 110. However, a difference (ΔERROR) between a target current (I_Target) and the output current (I_VCM) is generated at a high driving current region, such that a non-linear output current (I_VCM) occurs. As the high driving current region (see reference symbols A, B, and C) is increased, a current difference (I_ERROR) between the target current (I_Target) and the output current (I_VCM) increases. That is, an operating region of the P MOSFETs PM1 and PM2 of the transistor unit 132 is changed from a saturation region into a linear region in the high driving current region, such that non-linearity is generated in linear current driving characteristics due to a current mirror effect.

Referring to FIG. 4B, similarly to a description of FIG. 4A, an output voltage (V_OUT@Linear) of the driver 130 needs to be linearly increased in accordance with an increase in the feedback voltage (V_FB) of the driving controller 120, but non-linearity of the output voltage (V_OUT) of the driver 130 is increased in a high-driving current region.

Referring to FIG. 4C, resistance of the coil of the voice coil motor is increased due to a high temperature or a high driving current, and the operation region of the P MOSFETs PM1 and PM2 of the transistor unit 132 is changed from the saturation region to the linear region in accordance with the increase in resistance, such that linearity is deteriorated in accordance with a decrease in output current (see reference symbol a).

Figure 5:
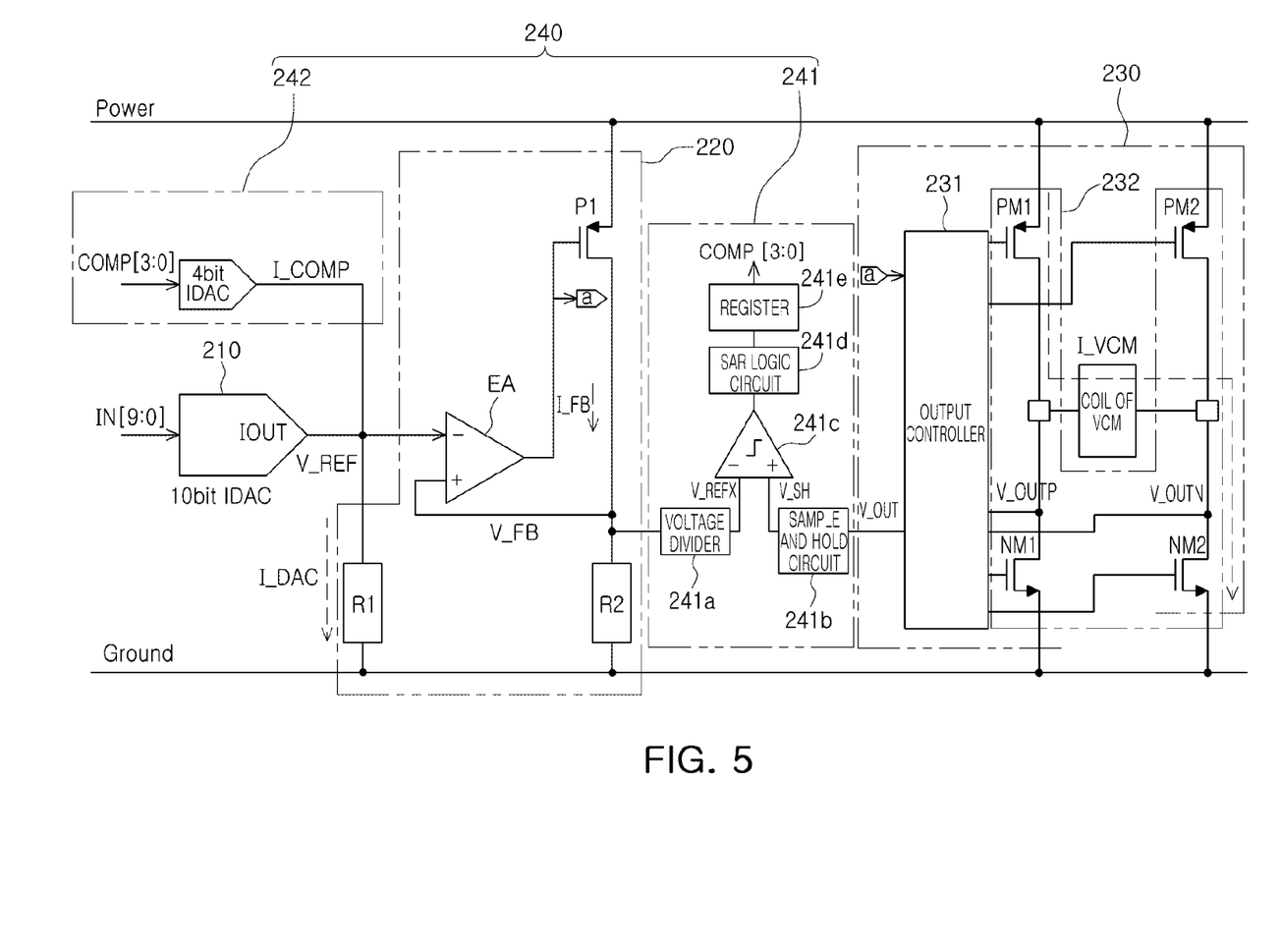
FIG. 5 is a schematic circuit diagram of a voice coil motor driver according to another embodiment.

FIG. 5 is a schematic circuit diagram of a voice coil motor driver according to another embodiment. Referring to FIG. 5, a voice coil motor driver 200 according to another embodiment includes a voice motor driver 100 and further includes a linearity compensation circuit 240.

A reference current generator 210, a driving controller 220, and a driver 230 illustrated in FIG. 5 are similar to, and have similar function as, those of the reference current generator 110, the driving controller 120, and the driver 130, respectively, as described above.

The linearity compensation circuit 240 includes a detector 241 and a current compensator 242.

The detector 241 compares a detection voltage (V_OUT), obtained by detecting an output current of the driver 230, to a feedback voltage (V_FB) to determine a difference therebetween. Additionally, the detector 241 controls current compensation using a successive approximation register (SAR) method.

The current compensator 242 adds a compensation current (I_COMP) to or subtracts the compensation current (I_COMP) from a reference current (I_REF) of the reference current generator 210 depending on a control (COMP[3:0]) of the detector 241. For example, the current compensator 242 is a 4-bit current mode digital-analog converter (4 bit IDAC).

The detector 241 includes a voltage divider 241a, a sample and hold circuit 241b, a voltage comparator 241c, a SAR logic circuit 241d, and a register 241e.

The voltage divider 241a divides the feedback voltage (V_FB) to output a divided feedback voltage (V_REFX) to the voltage comparator 241c.

The sample and hold circuit 241b maintains the detection voltage (VOUT) obtained by detecting the voltage output from the driver for a preset time to provide the detection voltage (VOUT) to the voltage comparator 241c.

The voltage comparator 241c compares the divided feedback voltage (V_REFX) to the detection voltage (V_OUT), and the SAR logic circuit 241d performs a logic operation on the voltage output by the voltage comparator 241c using a successive approximation register (SAR) method.

The register 241e outputs a control signal (COM[3:0]) corresponding to a result of the logic operation of the SAR logic circuit 241d to the current compensator 242. In other words, codes corresponding to the result of the logic operation of the SAR logic circuit 241d are stored in the register 241, and are output in the form of the control signal (COM[3:0]) in response to the SAR logic circuit 241d result.

Figure 6A:
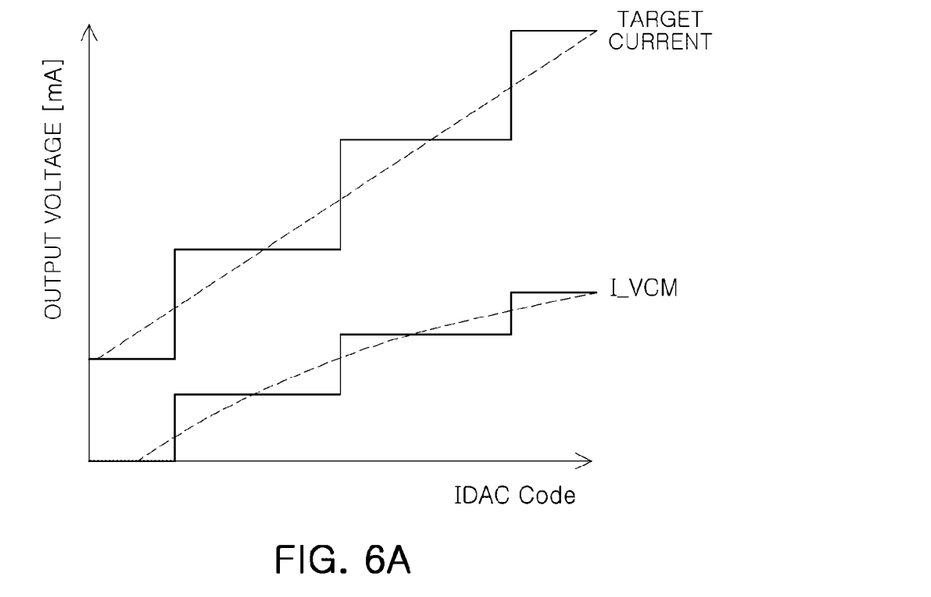
Figure 6B:
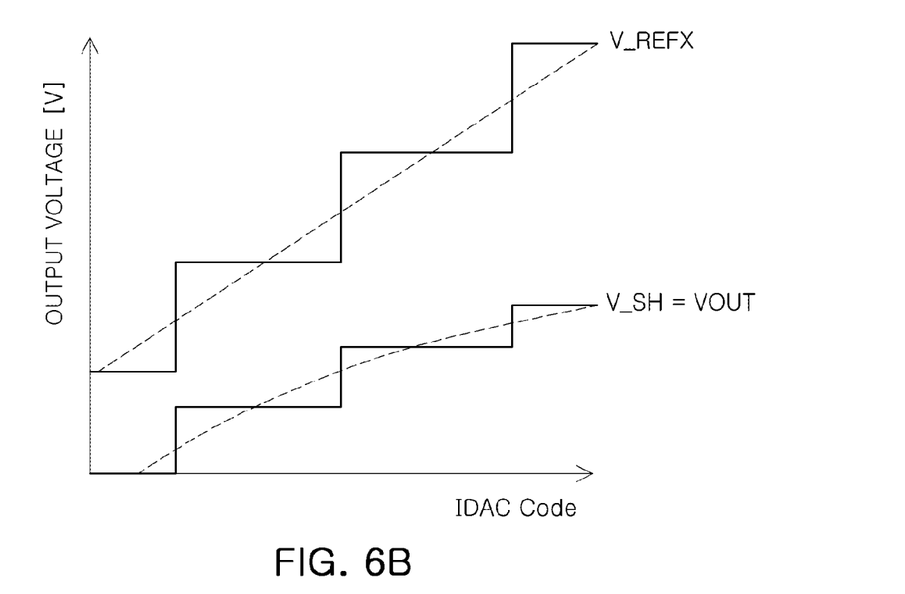
Figure 7:
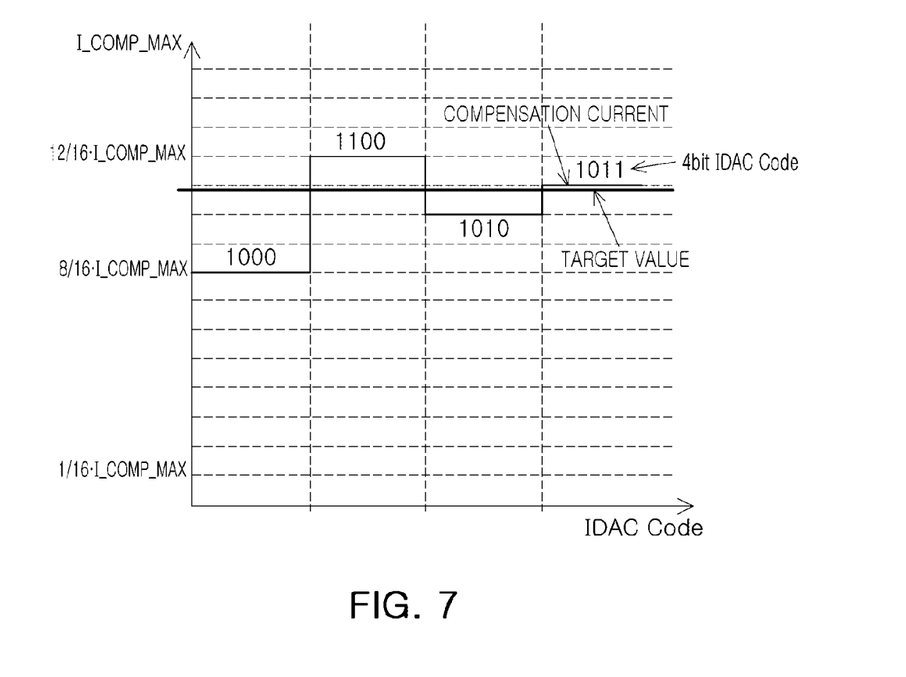

FIGS. 6A, 6B and 7 are graphs illustrating a linearity compensation operation of the voice coil motor driver illustrated in FIG. 5.

Referring to FIGS. 6A and 6B, a difference between a target current desired by a user and an output current (I_VCM) of the driver having a non-linear response, as illustrated in FIG. 6A, is similar to a difference between the divided feedback voltage (V_REFX) and a detection current (V_SH, VOUT), as illustrated in FIG. 6B.

Referring to FIG. 7, the detector 241 provides a compensation code 1000, 1100, 1010, or 1011 based on an error difference between the voltage output by the driver and the divided feedback voltage to the current compensator 242 according to the SAR method. The current compensator 242 may add or subtract the compensation current so that a compensated current is approximate to a target value to compensate for the reference current (I_REF). Therefore, linearity may be improved so that the output current of the driver is substantially the same as the target current.

As set forth above, according to one or more embodiments, linear current driving may be stably achieved. Additionally, linear response in the high driving current region may be improved. Non-linear driving characteristics caused by a temperature and process variation may be compensated for. Thus, linearity degradation due to an increase in resistance of the coil of the voice coil motor caused by a high temperature and high driving current may be decreased.

As a non-exhaustive example only, a device as described herein may be a mobile device, such as a cellular phone, a smart phone, a wearable smart device (such as a ring, a watch, a pair of glasses, a bracelet, an ankle bracelet, a belt, a necklace, an earring, a headband, a helmet, or a device embedded in clothing), a portable personal computer (PC) (such as a laptop, a notebook, a subnotebook, a netbook, or an ultra-mobile PC (UMPC), a tablet PC (tablet), a phablet, a personal digital assistant (PDA), a digital camera, a portable game console, an MP3 player, a portable/personal multimedia player (PMP), a handheld e-book, a global positioning system (GPS) navigation device, or a sensor, or a stationary device, such as a desktop PC, a high-definition television (HDTV), a DVD player, a Blu-ray player, a set-top box, or a home appliance, or any other mobile or stationary device capable of wireless or network communication. In one example, a wearable device is a device that is designed to be mountable directly on the body of the user, such as a pair of glasses or a bracelet. In another example, a wearable device is any device that is mounted on the body of the user using an attaching device, such as a smart phone or a tablet attached to the arm of a user using an armband, or hung around the neck of the user using a lanyard.

The apparatuses, units, modules, devices, and other components illustrated in FIGS. 1, 2, 3, and that perform the operations described herein are implemented by hardware components. Examples of hardware components include controllers, sensors, generators, drivers, memories, comparators, arithmetic logic units, adders, subtractors, multipliers, dividers, integrators, and any other electronic components known to one of ordinary skill in the art. In one example, the hardware components are implemented by computing hardware, for example, by one or more processors or computers. A processor or computer is implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices known to one of ordinary skill in the art that is capable of responding to and executing instructions in a defined manner to achieve a desired result. In one example, a processor or computer includes, or is connected to, one or more memories storing instructions or software that are executed by the processor or computer. Hardware components implemented by a processor or computer execute instructions or software, such as an operating system (OS) and one or more software applications that run on the OS, to perform the operations described herein. The hardware components also access, manipulate, process, create, and store data in response to execution of the instructions or software. For simplicity, the singular term "processor" or "computer" may be used in the description of the examples described herein, but in other examples multiple processors or computers are used, or a processor or computer includes multiple processing elements, or multiple types of processing elements, or both. In one example, a hardware component includes multiple processors, and in another example, a hardware component includes a processor and a controller. A hardware component has any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A voice coil motor driver, comprising:
   a driving controller comprising:
   a comparator configured to compare a reference voltage and a negative feedback voltage to output a driving control signal,
   a P metal-oxide-semiconductor field-effect transistor configured to activate or deactivate according to the driving control signal, and to allow a current generating the negative feedback voltage to flow when activated; and
   a driver configured to drive a coil of the voice coil motor according to the driving control signal.

2. The voice coil motor driver of claim 1, wherein the driver further comprises:
   a transistor unit comprising a current mirror circuit of the P metal-oxide-semiconductor field-effect transistor of the controller, wherein the current mirror circuit comprises P metal-oxide-semiconductor field-effect transistor; and
   an output controller configured to control a turn-on or turn-off operation of the P metal-oxide-semiconductor field-effect transistor of the transistor unit in response to the driving control signal.

3. The voice coil motor driver of claim 2, wherein the transistor unit further comprises:
   transistors, wherein the transistors form a half bridge or H-bridge.

4. The voice coil motor driver of claim 1, further comprising:
   a reference current generator configured to output a reference current, wherein the reference voltage is generated from the reference current.

5. The voice coil motor driver of claim 1, further comprising:
   a linearity compensation circuit configured to compensate for linearity of an output current of the driver.

6. The voice coil motor driver of claim 5, wherein the linearity compensation circuit comprises:
   a detector configured to compare a detection voltage to the feedback voltage, and the detector further configured to control compensation through successive approximation resistor; and
   a current compensator configured to add current to or subtract current from a reference current converted to the level of the reference voltage according to the control of the detector.

7. The voice coil motor driver of claim 6, wherein the detection voltage comprises an output voltage from the driver.

8. The voice coil motor driver of claim 6, wherein the detector comprises:
   a voltage divider configured to divide the feedback voltage;
   a sample and hold circuit configured to maintain a voltage level of the detection voltage for a predetermined time;
   a voltage comparator configured to compare an output of the voltage divider to an output of the sample and hold circuit;
   a successive approximation resistor (SAR) logic circuit configured to perform a logic operation on a voltage output from the voltage comparator; and
   a register configured to output a code corresponding to a result of the logic operation.

9. The voice coil motor driver of claim 8, wherein the register comprises:
   stored codes corresponding to results of logic operations.

10. A camera module, comprising:
    a sensor module configured to detect physical properties of a lens module and to output a detection signal indicative of the physical properties of the lens module;
    a controller configured to control movement of the lens module according to the detection signal; and
    a voice coil motor driver comprising a driving controller and being configured to:
    compare a reference voltage according to a control signal of the controller and a negative feedback voltage,
    generate a driving control signal, and
    drive a coil of a voice coil motor according to the driving control signal to move the lens module,
    wherein the driving controller comprises:
    a comparator configured to compare the reference voltage and the negative feedback voltage to output the driving control signal, and
    a P metal-oxide-semiconductor field-effect transistor configured to activate or deactivate according to the driving control signal, and to allow a current generating the negative feedback voltage to flow when activated.

11. The camera module of claim 10, wherein the voice coil motor driver further comprises:
    a reference current generator configured to generate a reference current according to the control signal of the controller;
    the driving controller is further configured to
    convert the reference current into the reference voltage; and
    a driver configured to drive the coil of the voice coil motor according to the driving control signal.

12. The camera module of claim 11, wherein the driver comprises:
    a transistor unit comprising a current mirror circuit of the P metal-oxide-semiconductor field-effect transistor of the driving controller, wherein the current mirror circuit comprises a P metal-oxide-semiconductor field-effect transistor; and
    an output controller configured to control a turn-on or turn-off operation of the P metal-oxide-semiconductor field-effect transistor of the transistor unit in response to the driving control signal.

13. The camera module of claim 12, wherein the transistor unit comprises:
    transistors, wherein the transistors form a half bridge or H-bridge.

14. The camera module of claim 11, wherein the voice coil motor driver further comprises:
    a linearity compensation circuit configured to compensate for linearity of an output current of the driver.

15. The camera module of claim 14, wherein the linearity compensation circuit comprises:
    a detector configured to compare a detection voltage to the feedback voltage to determine a difference therebetween, and control compensation using a successive approximation resistor; and
    a current compensator configured to add current to or subtract current from a reference current converted to the reference voltage according to control of the detector.

16. The camera module of claim 15, wherein the detection voltage comprises an output voltage from the driver.

17. The camera module of claim 15, wherein the detector comprises:

a voltage divider configured to divide the feedback voltage;

a sample and hold circuit configured to maintain a voltage level of the detection voltage for a predetermined time;

a voltage comparator configured to compare the output of the voltage divider to the output of the sample and hold circuit;

a successive approximation resistor logic circuit configured to perform a logic operation on a voltage output by the voltage comparator; and a register configured to transfer a code corresponding to a result of the logic operation.

18. The camera module of claim 17, wherein the register comprises:

stored codes corresponding to results of logic operations.

* * * * *